United States Patent
Grover et al.

(10) Patent No.: US 9,448,779 B2
(45) Date of Patent: Sep. 20, 2016

(54) EXECUTION OF RETARGETTED GRAPHICS PROCESSOR ACCELERATED CODE BY A GENERAL PURPOSE PROCESSOR

(75) Inventors: Vinod Grover, Mercer Island, WA (US); Bastiaan Joannes Matheus Aarts, San Jose, CA (US); Michael Murphy, Newark, CA (US); Jayant B. Kolhe, Milpitas, CA (US); John Bryan Pormann, Durham, NC (US); Douglas Saylor, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1605 days.

(21) Appl. No.: 12/408,559

(22) Filed: Mar. 20, 2009

(65) Prior Publication Data

US 2009/0259828 A1    Oct. 15, 2009

Related U.S. Application Data

(60) Provisional application No. 61/043,708, filed on Apr. 9, 2008.

(51) Int. Cl.
*G06F 9/45* (2006.01)
(52) U.S. Cl.
CPC .................. *G06F 8/45* (2013.01); *G06F 8/456* (2013.01)
(58) Field of Classification Search
CPC ................................. G06F 8/314; G06F 8/45
USPC .......................... 717/140, 149, 119
See application file for complete search history.

(56) References Cited

U.S. PATENT DOCUMENTS

| | | | |
|---|---|---|---|
| 5,048,018 A | 9/1991 | Bernstein et al. |
| 5,161,216 A | 11/1992 | Reps et al. |
| 5,488,713 A | 1/1996 | Norton et al. |
| 5,860,009 A | 1/1999 | Uchihira et al. |

(Continued)

FOREIGN PATENT DOCUMENTS

| | | |
|---|---|---|
| JP | 2001222516 A | 8/2001 |
| JP | 2007048052 A | 8/2001 |

(Continued)

OTHER PUBLICATIONS

Stratton, John A., Stone, Sam S., and Hwu, Wen-mei W. "MCUDA: An Efficient Implementation of CUDA Kernels on Multi-cores", IMPACT Technical Report 08-01, University of Illinois at Urbana-Champaign, Feb. 2008.*

(Continued)

*Primary Examiner* — Francisco Aponte
(74) *Attorney, Agent, or Firm* — Artegis Law Group, LLP

(57) ABSTRACT

One embodiment of the present invention sets forth a technique for translating application programs written using a parallel programming model for execution on multi-core graphics processing unit (GPU) for execution by general purpose central processing unit (CPU). Portions of the application program that rely on specific features of the multi-core GPU are converted by a translator for execution by a general purpose CPU. The application program is partitioned into regions of synchronization independent instructions. The instructions are classified as convergent or divergent and divergent memory references that are shared between regions are replicated. Thread loops are inserted to ensure correct sharing of memory between various threads during execution by the general purpose CPU.

22 Claims, 6 Drawing Sheets

(56) References Cited

U.S. PATENT DOCUMENTS

| | | | |
|---|---|---|---|
| 5,867,649 | A | 2/1999 | Larson |
| 5,903,899 | A | 5/1999 | Steele, Jr. |
| 5,953,530 | A | 9/1999 | Rushi et al. |
| 6,275,980 | B1* | 8/2001 | Uchihira et al. ............ 717/124 |
| 6,292,822 | B1 | 9/2001 | Hardwick |
| 6,598,222 | B2 | 7/2003 | Uchihira et al. |
| 6,748,353 | B1 | 6/2004 | Iliff |
| 6,961,925 | B2 | 11/2005 | Callahan, II et al. |
| 7,058,945 | B2* | 6/2006 | Ichinose et al. ............ 718/102 |
| 7,119,808 | B2 | 10/2006 | Gonzalez et al. |
| 7,454,341 | B1 | 11/2008 | Pan et al. |
| 7,493,606 | B2 | 2/2009 | Morin |
| 7,788,468 | B1* | 8/2010 | Nickolls ............... G06F 9/00 712/22 |
| 7,788,672 | B2 | 8/2010 | Tanaka |
| 7,865,883 | B1 | 1/2011 | Sistare et al. |
| 8,051,412 | B2 | 11/2011 | Kasahara et al. |
| 8,572,588 | B2* | 10/2013 | Grover ................... G06F 8/456 712/220 |
| 8,612,732 | B2* | 12/2013 | Grover ................... G06F 8/456 712/22 |
| 8,615,770 | B1* | 12/2013 | Stratton ............... G06F 9/4843 718/100 |
| 8,776,030 | B2* | 7/2014 | Grover ................... G06F 8/456 717/136 |
| 8,959,497 | B1* | 2/2015 | Stratton ................. G06F 8/456 717/140 |
| 8,984,498 | B2* | 3/2015 | Grover ................... G06F 8/456 717/136 |
| 2004/0205739 | A1 | 10/2004 | Haber et al. |
| 2005/0010911 | A1 | 1/2005 | Kim et al. |
| 2005/0022173 | A1* | 1/2005 | Kanade ................ G06F 9/4881 717/140 |
| 2005/0149904 | A1 | 7/2005 | Ball et al. |
| 2005/0273772 | A1 | 12/2005 | Matsakis et al. |
| 2006/0031814 | A1* | 2/2006 | Morin .................... 717/104 |
| 2007/0038987 | A1* | 2/2007 | Ohara et al. ................. 717/151 |
| 2007/0283337 | A1* | 12/2007 | Kasahara et al. ............ 717/149 |
| 2008/0114937 | A1* | 5/2008 | Reid et al. ................... 711/117 |
| 2008/0163184 | A1 | 7/2008 | Kanade |
| 2008/0244592 | A1 | 10/2008 | Uchihira |
| 2009/0077360 | A1 | 3/2009 | Liu et al. |

FOREIGN PATENT DOCUMENTS

| | | |
|---|---|---|
| TW | 200638210 A | 11/2006 |
| TW | 200745987 A | 12/2007 |
| TW | 200816039 | 4/2008 |
| WO | WO 2008/127610 | 10/2008 |
| WO | WO 2008/127622 | 10/2008 |
| WO | WO 2008/127623 | 10/2008 |

OTHER PUBLICATIONS

Lee, Sang-Ik, Johnson, Troy A., and Eigenmann, Rudolf. "Cetus—An Extensible Compiler Infrastructure for Source-to-Source Transformation", 16th Annual Workshop on Languages and Compilers for Parallel Computing (LCPC' 2003), 2003.*

Nickolls, John, Buck, Ian, and Garland, Michael. "Scalable Parallel Programming with CUDA", ACM Queue vol. 6 Issue 2, p. 40-53.*

Ernst, M. D. "Serializing parallel programs by removing redundant computation". Master's thesis. MIT, Cambridge, Mass. 1992. (Revised Aug. 1994.).*

Ram Rangan, Neil Vachharajani, Manish Vachharajani, David I. August. "Decoupled Software Pipelining with the Synchronization Array". Proceedings of the 13th International Conference on Parallel Architectures and Compilation Techniques. pp. 177-188, Sep. 29-Oct. 3, 2004.*

Guilherme Ottoni, Ram Rangan, Adam Stoler, David I. August. "Automatic Thread Extraction with Decoupled Software Pipelining," MICRO. pp. 105-118. 38th Annual IEEE/ACM International Symposium on Microarchitecture (MICRO'05) 2005.*

Shane Ryoo, Christopher I. Rodrigues, Sara S. Baghsorkhi, Sam S. Stone, David B. Kirk, Wen-mei W. Hwu. Optimization principles and application performance evaluation of a multithreaded GPU using CUDA, Proceedings of the 13th ACM SIGPLAN Symposium on Principles and practice of parallel programming, Feb. 20-23, 2008, Salt Lake City, UT, USA.*

Scalable Parallel Programming John Nickolls, Ian Buck, and Michael Garland, Nvidia, Kevin Skadron, University of Virginia—Mar./Apr. 2008 ACM Queue.*

Optimization Principles and Application Performance Evaluation of a Multithreaded GPU Using CUDA—Shane Ryoo, Christopher I. Rodrigues, Sara S. Baghsorkhi, Sam S. Stone, Wen-mei W. Hwu—Center for Reliable and High-Performance Computing, University of Illinois at Urbana-Champaign; David B. Kirk—NVIDIA Corporation—PPoPP '08, Feb. 20-23.*

Combined Search and Examination Report, GB App. No. 0905719. 1, Jul. 17, 2009.

Notice of Preliminary Rejection, KR Application No. 10-2009-31038, dated Oct. 25, 2011.

Eli Tilevich, et al. "J-Orchestra: Automatic Java Application Partitioning," Proc. of the 16th European Conference Ojbect Oriented Programming (ECOOP 2002), pp. 178-204, Jun. 10-14, 2002.

D.Y. Hwang, et al., "Transform Nested Loops into MultiThread in Java Programming Language for Parallel Processing," KIPS Journal, vol. 5, No. 8, pp. 1997-2012, 1998.

Notice of Preliminary Rejection, KR Application No. 10-2009-31039, dated Oct. 25, 2011.

Moss, et al. "Toward Acceleration of RSA Using 3D Graphics Hardware," LNCS 4887, Dec. 2007, pp. 369-388.

Office Action, U.S. Appl. No. 12/393,763, dated Feb. 7, 2012.

"Posix Cell API," Symposium on Advanced Computing Systems and Infrastructures, IPSJ Symposium Series vol. 2007, No. 5, dated May 23, 2007, pp. 162-163 (4 pages total).

Ohshima, et al., "Message Passing GPGPU Programming," IPSJ SIG Technical Reports, ISSN 0919-6072 vol. No. 19, 2008 pp. 109-114.

Final Office Action, U.S. Appl. No. 12/415,075, dated Jan. 7, 2013.

Non Final Office Action, U.S. Appl. No. 12/415,075, dated Jun. 7, 2012.

Non Final Office Action, U.S. Appl. No. 12/415,090, dated Jun. 11, 2012.

Non Final Office Action, U.S. Appl. No. 12/415,118, dated Jun. 21, 2012.

Non Final Office Action, U.S. Appl. No. 12/407,711, dated Mar. 28, 2012.

Stratton et al., "MCUDA: An Efficient Implementation of CUDA Kernels for Multi-core CPUs", J.N. Amaral (Ed.) PCPC 2008, pp. 16-30.

* cited by examiner

EXECUTION OF RETARGETTED GRAPHICS PROCESSOR ACCELERATED CODE BY A GENERAL PURPOSE PROCESSOR

CROSS-REFERENCE TO RELATED APPLICATIONS

This application claims benefit of U.S. provisional patent application Ser. No. 61/043,708 filed Apr. 9, 2008, and titled "System For Executing GPU-Accelerated Code on Multi-Core Architectures." The subject material of this related application is hereby incorporated herein by reference.

BACKGROUND OF THE INVENTION

1. Field of the Invention

Embodiments of the present invention relate generally to compiler programs and more specifically to an application program that is written for execution by a multi-core graphics processor and retargeted for execution by a general purpose processor with shared memory.

2. Description of the Related Art

Modern graphics processing systems typically include a multi-core graphics processing unit (GPU) configured to execute applications in a multi-threaded manner. The graphics processing systems also include memory with portions that shared between the execution threads and dedicated to each thread.

NVIDIA's CUDA™ (Compute Unified Device Architecture) technology provides a C language environment that enables programmers and developers to write software applications to solve complex computational problems such as video and audio encoding, modeling for oil and gas exploration, and medical imaging. The applications are configured for parallel execution by a multi-core GPU and typically rely on specific features of the multi-core GPU. Since the same specific features are not available in a general purpose central processing unit (CPU), a software application written using CUDA may not be portable to run on a general purpose CPU.

As the foregoing illustrates, what is needed in the art is a technique for enabling application programs written using a parallel programming model for execution on multi-core GPUs to run on general purpose CPUs without requiring the programmer to modify the application program.

SUMMARY OF THE INVENTION

One embodiment of the present invention sets forth a method for configuring a general purpose processor to execute a translated application program. The method includes receiving the translated application program that is converted from an application program written using a parallel programming model for execution on a multi-core graphics processing unit and compiling the translated application program to produce compiled code for execution by the general purpose processor. The number of execution cores in the general purpose processor that are available to execute the compiled code is determined and the general purpose processor is configured to enable the number of execution cores. The compiled code is launched for execution by the general purpose processor including the number of execution cores.

One advantage of the disclosed method is that application programs written using a parallel programming model for execution on multi-core GPUs are portable to general purpose CPUs without modification. Portions of the application that rely on specific features of the multi-core GPU are converted by a translator for execution by a general purpose CPU. The application program is partitioned into regions of synchronization independent instructions. The instructions are classified as convergent or divergent and divergent memory references that are shared between regions are replicated. Thread loops are inserted to ensure correct sharing of memory between various threads during execution by the general purpose CPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
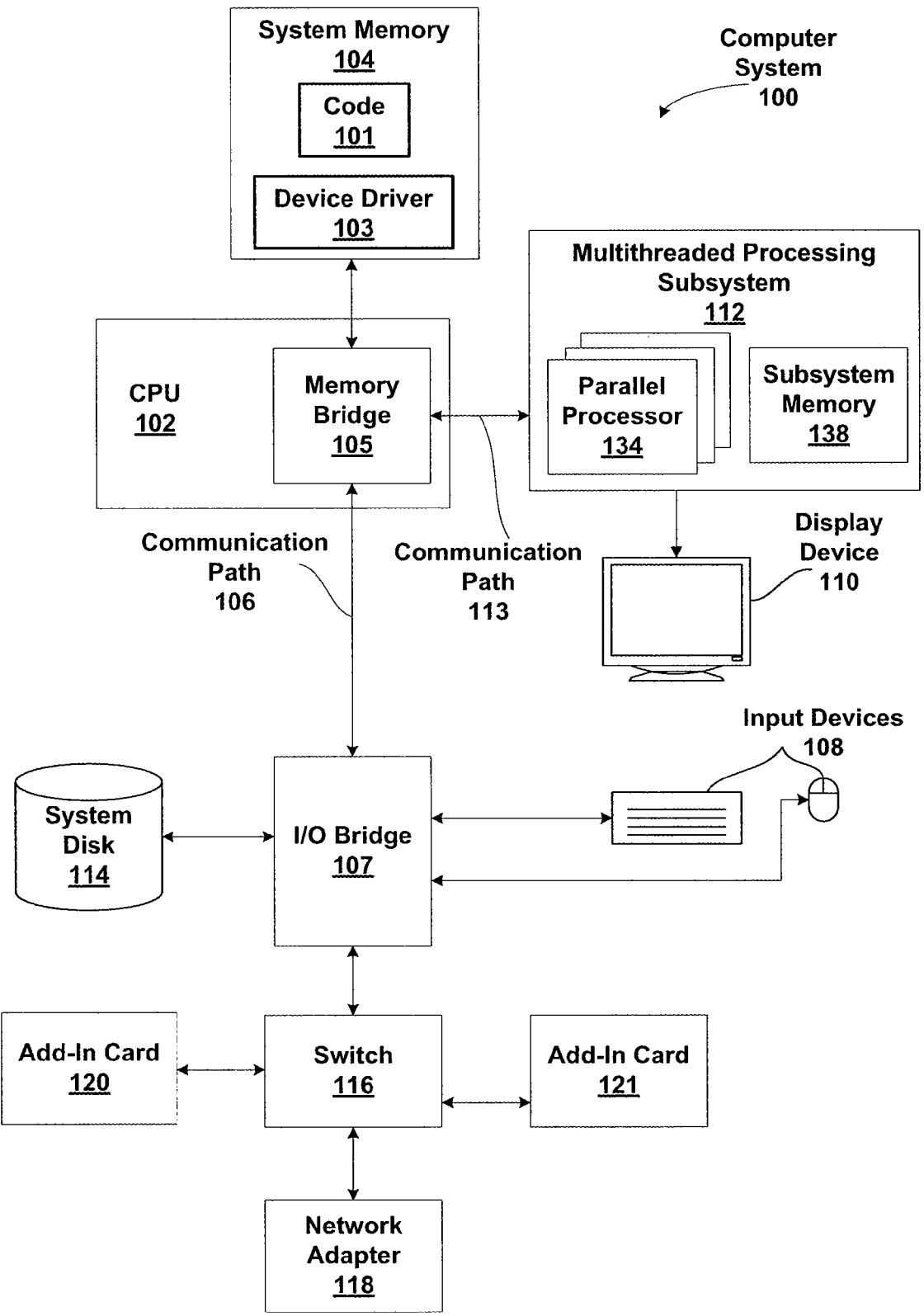
FIG. 1 is a block diagram illustrating a computer system.

FIG. 1 is a block diagram illustrating a computer system 100 configured to execute code written using CUDA. Computer system 100 includes a CPU 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A multithreaded processing subsystem 112 is coupled to memory bridge 105 via a bus or other communication path 113 (e.g., a PCI Express, Accelerated Graphics Port, or HyperTransport link). In one embodiment, multi-threaded processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

CPU 102 operates as the control processor of computer system 100, managing and coordinating the operation of other system components. In particular, CPU 102 issues commands that control the operation of parallel processors 134 within multithreaded processing subsystem 112. In some embodiments, CPU 102 writes a stream of commands for parallel processors 134 to a command buffer (not shown), which may reside in system memory 104, subsystem memory 138, or another storage location accessible to both CPU 102 and parallel processors 134. Parallel processors 134 read the command stream from the command buffer and execute commands asynchronously with respect to the operation of CPU 102.

System memory 104 includes an execution image of an operating system, a device driver 103, and CUDA code 101 that is configured for execution by multithreaded processing subsystem 112. CUDA code 101 incorporates programming instructions intended to execute on multithreaded processing subsystem 112. In the context of the present description, code refers to any computer code, instructions, and/or functions that may be executed using a processor. For example, in various embodiments, the code may include C code, C++ code, etc. In one embodiment, the code may include a language extension of a computer language (e.g., an extension of C, C++, etc.).

The operating system provides the detailed instructions for managing and coordinating the operation of computer system 100. Device driver 103 provides detailed instructions for managing and coordinating operation of the multithreaded processing subsystem 112, and in particular parallel processors 134. Furthermore, device driver 103 may provide compilation facilities for generating machine code specifically optimized for parallel processors 134. Device driver 103 may be provided in conjunction with the CUDA™ framework provided by NVIDIA Corporation.

In one embodiment, the multithreaded processing subsystem 112 incorporates one or more parallel processors 134 which may be implemented, for example, using one or more integrated circuit devices such as programmable processors, application specific integrated circuits (ASICs). Parallel processors 134 may include circuitry optimized for graphics and video processing, including, for example, video output circuitry, and a graphics processing unit (GPU). In another embodiment, the multithreaded processing subsystem 112 may be integrated with one or more other system elements, such as the memory bridge 105, CPU 102, and I/O bridge 107 to form a system on chip (SoC). One or more parallel processors 134 may output data to display device 110 or each parallel processor 134 may output data to one or more display devices 110.

Parallel processors 134 advantageously implements a highly parallel processor that includes one or more processing cores, each of which is capable of executing a large number of threads concurrently where each thread is an instance of a program, such as code 101. Parallel processors 134 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. Parallel processors 134 may transfer data from system memory 104 and/or local subsystem memory 138 into local (on-chip) memory, process the data, and write result data back to system memory 104 and/or subsystem memory 138, where such data can be accessed by other system components, including CPU 102 or another multithreaded processing subsystem 112.

A parallel processor 134 may be provided with any amount of subsystem memory 138, including no subsystem memory 138, and may use subsystem memory 138 and system memory 104 in any combination. For instance, a parallel processor 134 can be a graphics processor in a unified memory architecture (UMA) embodiment. In such embodiments, little or no dedicated subsystem memory 138 would be provided, and parallel processor 134 would use system memory 104 exclusively or almost exclusively. In UMA embodiments, a parallel processor 134 may be integrated into a bridge chip or processor chip or provided as a discrete chip with a high-speed link (e.g., PCI-E) connecting the parallel processor 134 to system memory 104 via a bridge chip or other communication means.

As noted above, any number of parallel processors 134 can be included in a multithreaded processing subsystem 112. For instance, multiple parallel processors 134 can be provided on a single add-in card, or multiple add-in cards can be connected to communication path 113, or one or more parallel processors 134 can be integrated into a bridge chip. Where multiple parallel processors 134 are present, those parallel processors 134 may be operated in parallel to process data at a higher throughput than is possible with a single parallel processor 134. Systems incorporating one or more parallel processors 134 may be implemented in a variety of configurations and form factors, including desktop, laptop, or handheld personal computers, servers, workstations, game consoles, embedded systems, and the like.

In some embodiments of parallel processors 134, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime. Functional units within parallel processors 134 support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.).

The series of instructions transmitted to a particular processing unit (not shown) within a processing core (not shown) of parallel processors 134 constitutes a thread, as previously defined herein, and the collection of a certain number of concurrently executing threads across the processing units within one processing core is referred to herein as a "thread group." As used herein, a "thread group" refers to a group of threads executing the same program on different input data, with each thread of the group being assigned to a different processing unit in a processing core. A thread group may include fewer threads than the number of processing units, in which case some processing units will be idle during cycles when that thread group is being processed. A thread group may also include more threads than the number of processing units, in which case processing will take place over multiple clock cycles.

Since each processing core can support up to G thread groups concurrently, it follows that up to G×M thread groups can be executing in a processing core at any given time, where M is the number of processing cores in a parallel processor 134. Additionally, a plurality of related thread groups may be active (in different phases of execution) at the same time within a processing core. This collection of thread groups is referred to herein as a "cooperative thread array" ("CTA"). The size of a CTA is generally determined by the programmer and the amount of hardware resources, such as memory or registers, available to the CTA. The CUDA programming model reflects the system architecture of GPU accelerators. An exclusive local address space is available to each thread and a shared per-CTA address space is used to pass data between threads within a CTA. Processing cores also have access to off-chip "global" memory, which can include, e.g., subsystem memory 138 and/or system memory 104.

A host portion of a CUDA application program is compiled using conventional methods and tools, while kernel functions specify CTA processing. At the highest level, the CUDA memory model separates the host and device memory spaces, such that host code and kernel code can only directly access their respective memory spaces. API (application programming interface) functions allow copying of data between the host and device memory spaces. In the shared-memory CPU execution of the CUDA programming model, a controlling CPU thread can executing in parallel with the parallel CTAs without potential data races. The host memory space is defined by the C programming language and the device memory spaces are specified as Global, constant, local, shared, and texture. All threads may access the global, constant, and texture memory spaces. As previously explained, access to the local space is limited to a single thread and access to the shared space is limited to threads in a CTA. This memory model encourages using small memory spaces for low-latency accesses, and encourages wise usage of large memory spaces which typically have longer latency.

A CUDA program, such as code 101 is typically organized as a set of synchronous or asynchronous executions of CTAs in one, two, or three dimensions, e.g., x, y, and z. A 3-tuple index uniquely identifies threads within a thread block. Thread blocks themselves are distinguished by an implicitly defined 2-tuple variable. The ranges of these indexes are defined at runtime and the runtime environment checks that the indexes conform to any hardware limitations. Each CTA may be executed by a parallel processor 134 in parallel with other CTAs. Many CTAs may run in parallel with each parallel processor 134 executing one or more CTAs. The runtime environment is responsible for managing the execution of CUDA code 101 synchronously or asynchronously as required. Threads within a CTA communicate and synchronize with each other by the use of shared memory and a barrier synchronization primitive called synchthreads( ). CUDA guarantees that threads within a thread block will be live simultaneously, and provides constructs for threads within a thread block to perform fast barrier synchronizations and local data sharing. Distinct thread blocks within a CTA (defined by one or more dimensions) have no ordering imposed on their creation, execution, or retirement. In addition, parallel CTAs are not allowed access to system calls, including I/O. The CUDA programming model only enforces global synchronization between parallel CTAs, and provides intrinsic atomic operations for limited communication between blocks within a CTA.

The body of each thread, referred to as a kernel, is specified using CUDA which may be represented in standard C using memory model annotations and the barrier synchronization primitive. The semantics of a CUDA program is that each kernel is executed by all the threads in a CTA in an order that respects the memory ordering implied by the barrier synchronization primitive. In particular, all shared memory references within a CTA that occur before a barrier synchronization primitive must be completed before any shared memory references that occur after the barrier synchronization primitive.

Each instance of a barrier synchronization primitive in kernel code conceptually represents a separate logical barrier and should be treated as static. It is illegal to invoke a barrier synchronization primitive in both paths of an if-else construct when CUDA threads my take different branches of the construct. Although all threads within a thread block will reach one of the synchronization primitives, they represent separate barriers, each requiring that either all or none of the threads reach it. Therefore, such a kernel will not execute correctly. More generally, CUDA code is not guaranteed to execute correctly if a synchronization primitive is contained within any control flow construct that behaves differently for different threads within a thread block.

Figure 2:
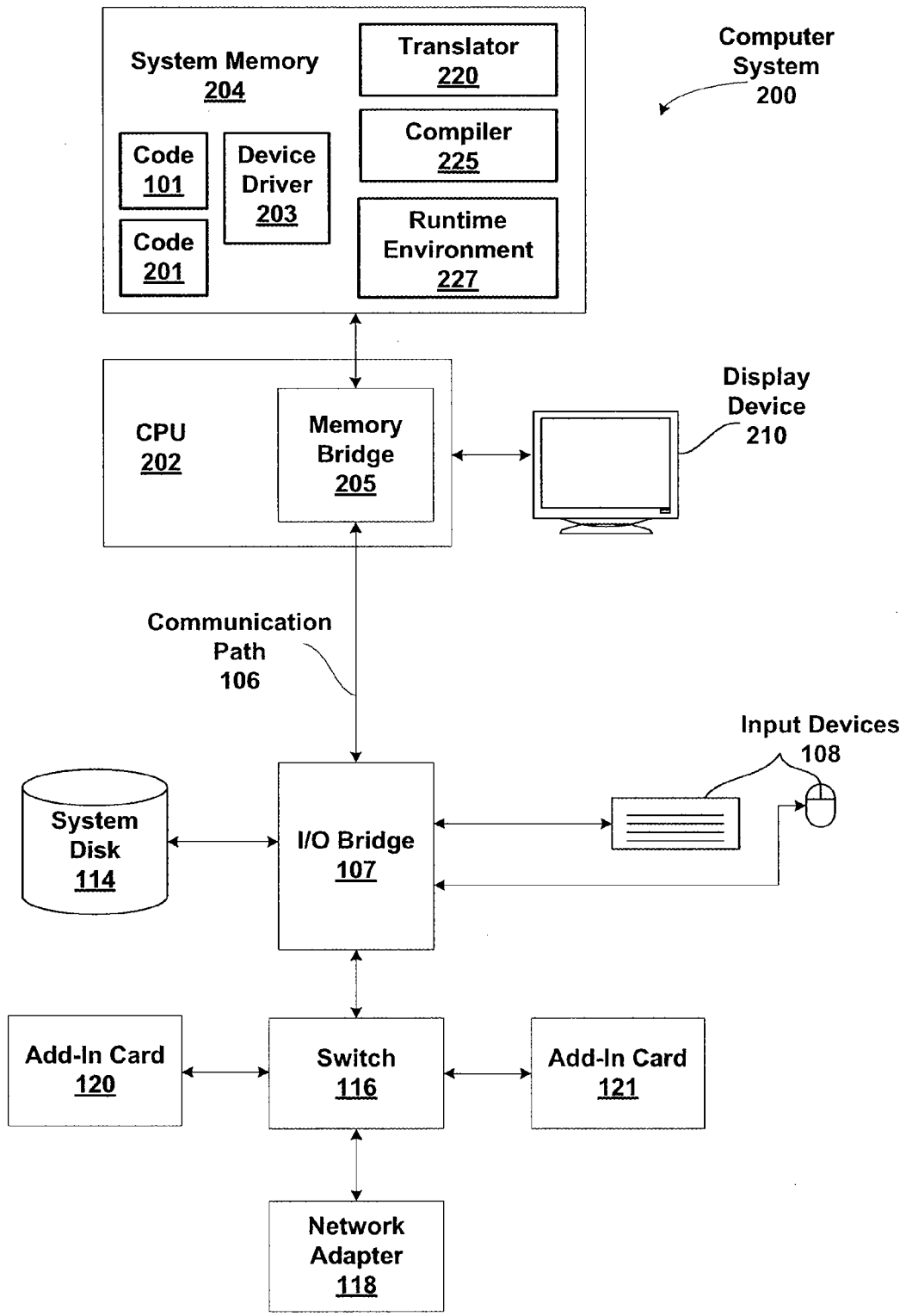
FIG. 2 is a block diagram illustrating a computer system, according to one embodiment of the present invention.

FIG. 2 is a block diagram illustrating a computer system 200, according to one embodiment of the present invention. Computer system 100 includes a CPU 202 and a system memory 204 communicating via a bus path that includes a memory bridge 205. Memory bridge 205, which may be, e.g., a Northbridge chip, is connected via a bus or other communication path 106 (e.g., a HyperTransport link) to an I/O (input/output) bridge 107. CPU 202 produces output for display on display device 210 (e.g., a conventional CRT or LCD based monitor).

Multithreaded processing subsystem 112 is not included in computer system 200 and CUDA code 101 is not adapted for execution by a general purpose processor, such as CPU 202. CUDA code 101, is adapted for execution by multi-threaded processing subsystem 112, and is translated using translator 220 to produce translated code 201 that does not include the barrier synchronization primitive. In order for CPU 202 to run the program represented by code 101, code 101 must first be translated into code 201. The translated code may then be compiled by compiler 225 for execution by CPU 202. Compiler 225 may perform optimizations that are specific to CPU 202. Translating the code refers to converting the code written in a first computer language into a second computer language. Compiling the code refers to converting the code written in a computer language (e.g., a source code) into another computer language (e.g., an object code). Translator 220 is described in conjunction with FIG. 3A and compiler 225 is described in conjunction with FIG. 4. Compiler 225 may be included within a device driver 203 that is configured to interface between code 101, code 201 and CPU 202. A runtime environment 227 is configured to implement functions for the compiled code, e.g., input and output, memory management, and the like. Runtime environment 227 also launches compiled code for execution by CPU 202. Translator 220 performs optimizing transformations to serialize operations across the fine-grained threads of a CUDA thread group into a single CPU thread, while the runtime environment 227 schedules thread groups as work units for parallel processing by CPU 202.

The primary obstacle preventing portability of CUDA applications designed to run on GPUs for execution by general purpose CPUs is the granularity of parallelism. Conventional CPUs do not support the hundreds of hardware thread contexts required for a single CUDA CTA. Therefore, the primary goal of a system implementing the CUDA programming model on a general purpose CPU is to distribute the task-level parallelism to the available CPU cores. At the same time, the system must consolidate the microthreads within a task into a single CPU thread to prevent excessive scheduling overhead and frequent inter-core synchronization.

Figure 3A:
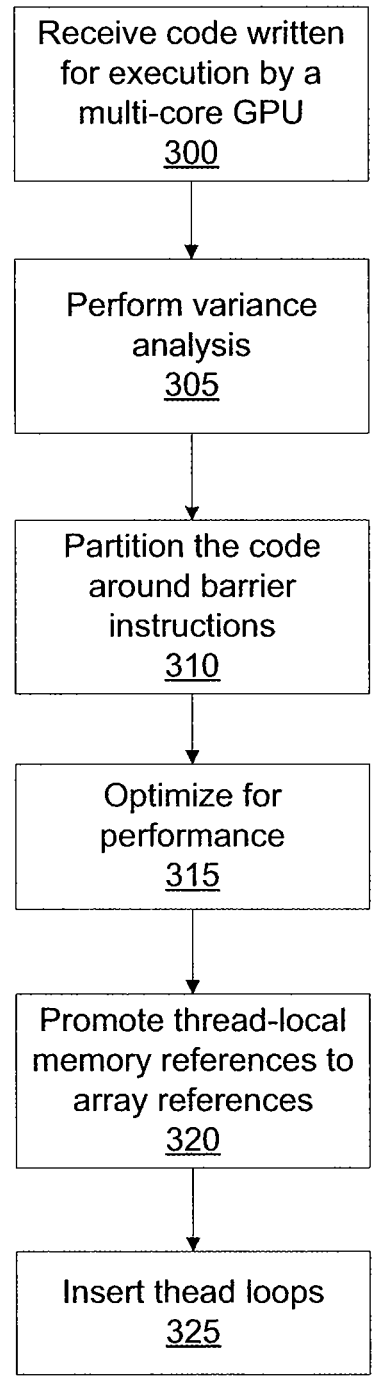
FIG. 3A is a flow diagram of method steps for translating code written for execution by a multi-core graphics processing unit to code for execution by a general purpose processor, according to one embodiment of the present invention.

FIG. 3A is a flow diagram of method steps for translating code 101 that written for execution by a multi-core graphics processing unit, e.g., multithreaded processing subsystem 112, to code 201 for execution by a general purpose processor, e.g., CPU 202, according to one embodiment of the present invention. Translator 220 is configured to perform one or more of the steps shown in FIG. 3A in order to preserve the barrier synchronization primitive semantic that is used in code 101. Translator 220 "unrolls" the parallel threads by partitioning code 101 around the barrier synchronization primitives, reduces the use of shared state, improves the locality of references for memory access, and inserts thread loops to transform CUDA-specific code for execution by a general purpose processor. It is possible to achieve good execution performance using CPU 202 to execute code 201 without changing CUDA code 101 that is targeted for execution by a multithreaded processing subsystem 112. Compiler 225 may exploit vector instructions capability provided by CPU 202 and perform optimizations when compiling code 201 for execution.

Figure 3B:
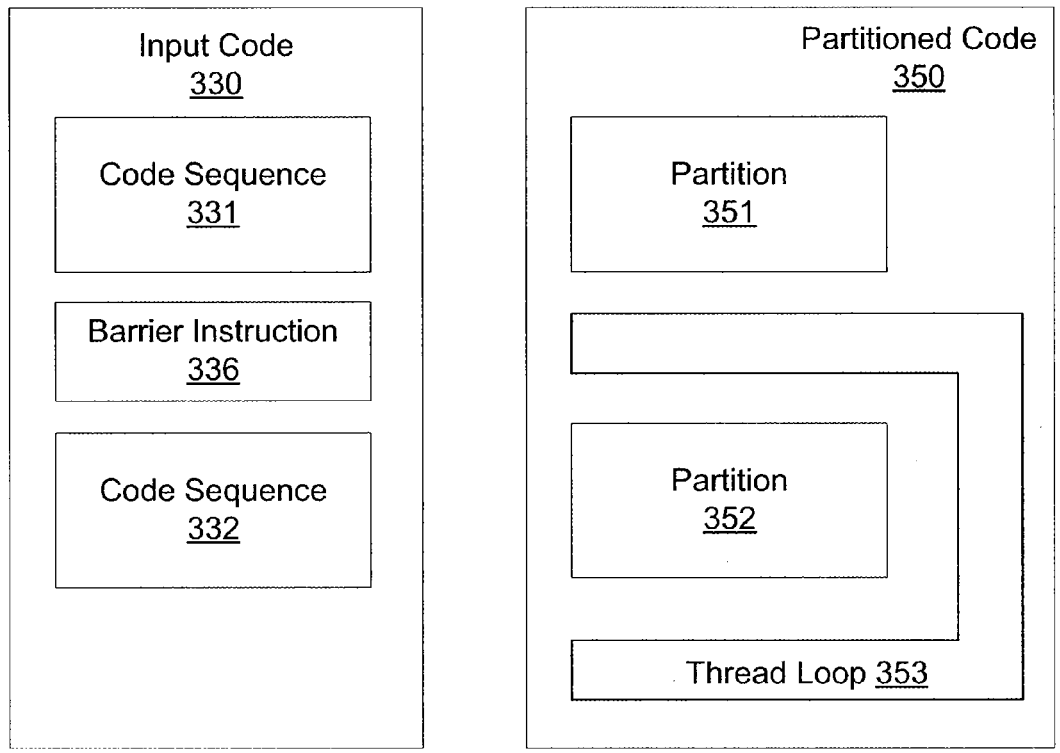
FIG. 3B is a conceptual diagram illustrating input code that is translated into partitioned code, according to one embodiment of the present invention.
Figure 3C:
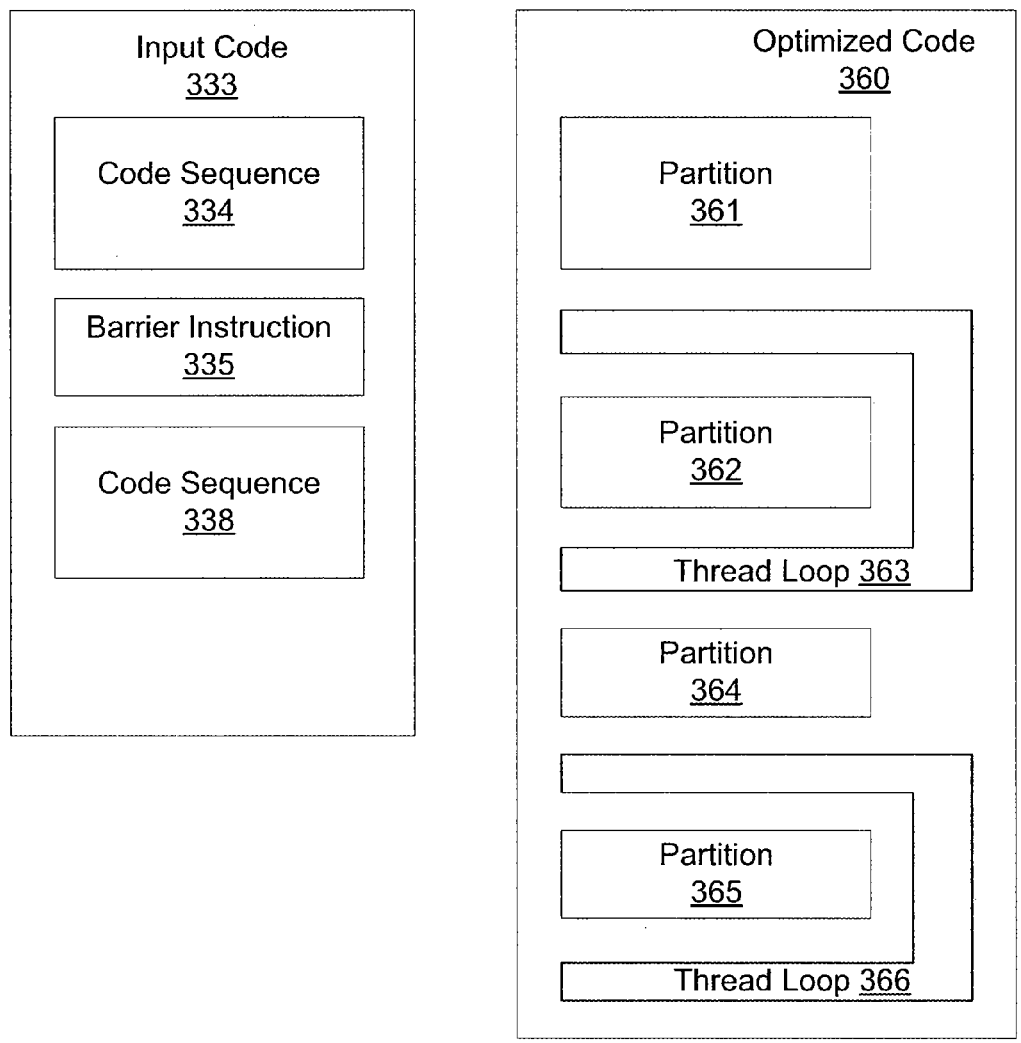
FIG. 3C is a conceptual diagram illustrating input code that is translated into optimized code, according to one embodiment of the present invention.

In step 300 translator 220 receives code 101 written for execution by a multi-core GPU, such as multithreaded processing subsystem 112 or a processor including one or more parallel processors 134, e.g., CUDA code 101. The code received in step 300 may be represented as a control flow graph consisting of basic block nodes connected by edges. Each basic block specifies the operations performed by target environment, e.g., CPU 202. In step 305 translator 220 partitions CUDA code 101 around the barrier synchronization primitives to produce partitioned code. The partitioned code is shown in FIGS. 3B and 3C and the partitioning process is described in conjunction with those figures. A synchronization partition is a region of code within which the ordering of operations is determined entirely by the control flow and data flow properties of the basic blocks within the partition. A partition has the property that a thread loop can be inserted around a partition to run the parallel threads. The control flow graph may be used to produce a synchronization partition control flow graph by replacing each synchthreads primitive with an edge, separating a basic block node into different partitions.

In step 310 the partitioned code is classified so that each statement is identified as either convergent or divergent. The partitioned code may include expressions and statements. An expression is a computation which may involve constants, implicit threadIDs, and named variables created by the programmer, but has no side-effects or assignments. A simple statement is defined as a computational expression resulting in a single assignment. A general statement can also represent a barrier, control flow conditional or loop construct, or a sequential block of statements. The CTA dimensions, x, y, and z are propagated through the code to determine whether each operation is dependent on one or more of the CTA dimensions. Operations that reference a threadID (thread identifier) in dimension x, y, and/or z are considered divergent since a thread that references a CTA dimension may diverge from other threads in the same CTA during execution. For example, an operation that depends on threadID.x is divergent for the x dimension. Another operation that does not depend on threadID.x is convergent in the x dimension. Divergent statements require thread loops for each CTA dimension that they reference.

In step 315 the partitioned code is optimized for performance using the classification information to produce optimized code. For example, instructions within a partition may be reordered to fuse operations so that those operations with the same classification are grouped together and can fall within the same thread loop that is inserted in step 325. Operations are ordered such that those operations with fewer threadID dimensions in their variance vector precede the operations that are dependent on more threadID dimensions. This reordering is valid, as a statement must have a variance vector which is a superset of the variance vectors of the statements on which it depends. Thus statements with only one dimension in their variance vector cannot depend on any statement with a different dimension or more than one dimension in their variance vector.

In step 320 thread-local memory references in the optimized code are promoted to array references as needed, to ensure that each instance of an object has a unique location in which to store a value. In particular, data that is carried from one partition to another needs to be duplicated so that it is available in each partition. A variable that meets one of the following conditions is promoted to an array reference: local variable that has a cross partition dependency (assigned in one partition and referenced in another partition).

In step 320 translator 220 promotes thread-local memory references to array references. The program shown in TABLE 1 includes a synchronization barrier primitive and divergent references.

TABLE 1

```
__global__ void function( ){
    int leftIndex, rightIndex;
    SharedMem[threadIdX.x] = ...; // store value into shared memory
    leftIndex = ...threadId.x...;
    rightIndex = ...threadId.x;
    __synchthreads( );
    = ...(SharedMem[leftIndex] + SharedMem[rightIndex])/2.0;
}
```

The program shown in TABLE 1 is partitioned into a first partition before the synchthreads primitive and a second partition after the synchthreads primitive. The second partition includes references (leftindex and rightIndex) that are computed in the first partition and depend from a CTA dimension. If the divergent references are not promoted, the second partition will incorrectly use the values computed by the last iteration of the first partition. The second partition should use the value computed for each corresponding iteration of threadId.x of the first partition. To ensure that the computation is correct, the divergent references are promoted as shown in TABLE 2.

TABLE 2

```
void function( ) {
    ...
    for (int tid_x = 0; tid_x < dimblock.X; tid_x++) {
        SharedMem[tid.x] = ...; // store value into shared memory
        leftIndexArray[tid_x] = ...threadId.x...;
        rightIndexArray[tid_x] = ...threadId.x;
    }
    for (int tid_x = 0; tid_x < dimblock.X; tid_x++) {
        = ...(SharedMem[leftIndexArray[tid_x]] +
            SharedMem[rightIndexArray[tid_x]])/2.0;
    }
}
```

In step 325 the thread loops are generated for those statements which contain threadID dimensions in their variance vectors. Adaptive loop nesting is used to simultaneously evaluate transformations equivalent to loop interchange, loop fission, and loop invariant removal to achieve the best redundancy removal. The nested loops are dynamically generated over values of each dimension of the threadID tuple to best suit the application, rather than assuming a particular loop nesting and evaluating the application based on that nesting. After the statements are ordered in step 315, loops may be generated for threadID dimensions only around those statements which contain that dimension in their variance vector. To remove loop overhead, translator 220 may fuse adjacent statement groups where one has a variance vector that is a subset of the other.

FIG. 3B is a conceptual diagram illustrating input code 101 that is translated into partitioned code 350, according to one embodiment of the present invention. Input code 330 is configured for execution by multithreaded processing subsystem 112 and includes code sequences 331 and 332 that are separated by synchronization barrier instruction 336. All threads in a CTA will complete execution of code sequence 331 before any one of the threads begins execution of code sequence 332. Translator 220 partitions input code 330 to produce partitioned code 350, where partition 351 includes the instructions represented by code sequence 331 and partition 352 includes the instructions represented by code sequence 332. A thread loop 353 is inserted around partition 352 to ensure that the synchronization semantic is maintained when partitioned code 350 is executed by a general purpose processor that does not natively support the synchronization barrier instruction. In this example, code partition 351 includes convergent references and partition 352 may include divergent references. Therefore, thread loop 353 is inserted around partition 352.

In step 325 of FIG. 3A, translator 220 inserts thread loops (such as thread loop 353) into the optimized code in order to produce code 201 that is translated for execution by CPU 202. Each partition may have a thread loop inserted for each CTA dimension. An example of synchronization partitioning and thread loop insertion is shown in TABLES 3 and 4. A program shown in TABLE 3 is translated into the program shown in TABLE 4.

TABLE 3

```
_global_ void function( ){
    SharedMem[threadIDX.x] = ...; // store value into shared memory
    _synchthreads( );
    =...(SharedMem[threadIDX.x] + SharedMem[threadIdX.x-1])/2.0;
}
```

The program in TABLE 3 uses explicit synchronization to ensure correct sharing of memory between various threads in a CTA. Translator 220 partitions the program into two partitions, each of which is dependent on the x CTA dimension. Therefore, a thread loop is inserted around each of the two partitions to ensure that the translated program performs the operations in the correct order.

TABLE 4

```
Void function( ){
    for (int tid_x = 0; tid_x < dimblock.X; tid_x++) {
        SharedMem[tid_x] = ...; //store value into shared memory
    }
    for (int tid_x = 0; tid_x < dimblock.X; tid_x++) {
        = ...(SharedMem[tid_x] + SharedMem[tid_x - 1])/2.0;
    }
}
```

A simpler technique for translating a program for execution by a general purpose processor inserts explicit thread loops for each CTA dimension, so that it is not necessary to determine the dimension dependency for references within the same partition. For example, the program shown in TABLE 5 is translated into the program shown in TABLE 6. Note that one or more of the thread loops inserted in TABLE 5 may be unnecessary since the program was produced without determining the dimension dependency.

TABLE 5

```
_global_void function( ){
    Shared1 = ...
    = Shared1
}
```

TABLE 6

```
void function( ){
    for (int tid_x = 0; tid_x < dimblock.X; tid_x++) {
        for (int tid_y = 0; tid_y < dimblock.Y; tid_y++) {
            for (int tid_z = 0; tid_z < dimblock.Z; tid_z++) {
                Shared1 = ...
                = Shared1
            }
        }
    }
}
```

FIG. 3C is a conceptual diagram illustrating input code 333 that is translated into optimized code 360, according to one embodiment of the present invention. Input code 333 is configured for execution by multithreaded processing subsystem 112 and includes code sequences 334 and 338 that are separated by synchronization barrier instruction 335. All threads in a CTA will complete execution of code sequence 334 before any one of the threads begins execution of code sequence 338. Translator 220 partitions input code 333 to produce partitioned code 360, where partition 361 includes the instructions represented by code sequence 334 and partitions 362, 364, and 365 include the instructions represented by code sequence 338.

Partition 362 includes a first portion of instructions that are divergent in a first CTA dimension. Partition 364 includes a second portion of instructions that are convergent. Partition 365 includes a third portion of instructions that are divergent in a second CTA dimension. A thread loop 363 is inserted around partition 362 to ensure that the synchronization semantic is maintained when partitioned code 360 is executed by a general purpose processor that does not natively support the synchronization barrier instruction. Thread loop 363 iterates over the first CTA dimension. A thread loop 366 is inserted around partition 365 to iterate over the second CTA dimension.

TABLE 7 shows an example CUDA kernel and TABLE 8 shows the translation of the CUDA kernel for execution by a general purpose processor. The example kernel multiplies a list of small matrices. Each thread block computes one small matrix multiplication out of the list, while each thread computes one element of the result matrix for its block.

TABLE 7

Example CUDA kernel

```
(1) __global__small_mm_list(float* A_list, float* B_list, , const
int size)
{
(2)     float sum;
(3)     int matrix_start, col, row, out_index, i;
(4)     martrix_start = blockIdx.x*size*size;
(5)     col = matrix_start + threadIDx.x;
(6)     row = matrix_start + threadIdx.y * size);
(7)     sum = 0.0;
(8)     for (i = 0; i < size; i++)
(9)         sum += A_list[row + i] * B_list[col + (i*size)];
        // Synchronize before overwriting input data
(10)    __syncthread( );
(11)    out_index = matrix_start + (threadIdx.y * size) +
        threadIdx.x;
(12)    A_list[out_index] = sum;
}
```

Note that the statement at line (9) of TABLE 7 has a variance vector of (x,y) since col is dependent on the x dimension and row is dependent on the y dimension. The z dimension is never used, so no loop is inserted that iterates over z. Typical cost analysis techniques may be used to determine cases such as statements 5 and 6 in the example kernel shown in TABLE 7. As each is only dependent on one threadID dimension, choosing either nesting order of the x and y index loops will force either redundant execution of a statement, or a redundant loop outside the main loop nest of the partition.

TABLE 8

Translated CUDA kernel

```
(1) __global__small_mm_list(float* A_list, float* B_list, , const int
size)
{
(2)     float sum[ ];
(3)     int matrix_start[ ], col[ ], row[ ], out_index, i;
(4)     matrix_start[threadID] = blockIDx.x*size*size;
        for(threadID.x = 0; threadID.x < blockDim.x; threadID.x++)
        {
(5)         col[threadID] = matrix_start + threadIDx.x;
            for(threadID.y = 0; threadID.y < blockDim.y;
            threadID.y++) {
(6)             row[threadID] = matrix_start[threadID] +
                (threadIDx.y * size);
(7)             sum[threadID] = 0.0;
(8)             for (i[threadID] = 0; i < size; i++)
(9)                 sum[threadID] += A_list[row[threadID] + i] *
                    B_list[col[threadID] + (i*size)];
            }
        }
(10)    for (threadID.x = 0; threadID.x < blockDim.x;
        threadID.x++) {
            for (threadID.y = 0; threadID.y < blockDim.y;
            threadID.y++) {
(11)            out_index = matrix_start[threadID] +
                (threadID.y * size) + threadID.x;
(12)            A_list[out_index] = sum[threadID];
            }
        }
}
```

Figure 4:
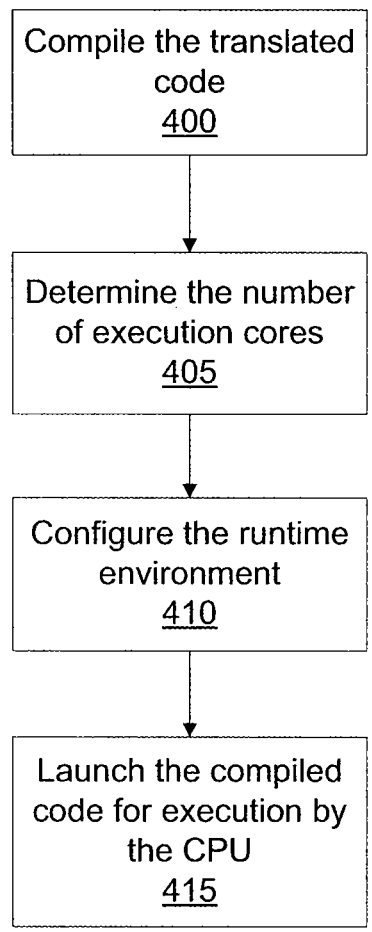
FIG. 4 is a flow diagram of method steps for execution of the translated code by a general purpose processor, according to one embodiment of the present invention.

FIG. 4 is a flow diagram of method steps for execution of the translated code 201 by a general purpose processor, such as CPU 202, according to one embodiment of the present invention. In step 400 compiler 225 compiles translated code 201, optionally performing CPU specific optimizations, to produce compiled code. In step 405 the number of execution cores 400 that are available in CPU 202 is determined by device driver 203. Translated code 201 may be automatically scaled for execution on the available execution cores for improved performance. In step 410 runtime environment 227 or device driver 203 configures CPU 202 to enable the number of execution cores that will execute translated code 201.

Runtime environment 227 may create a number of operating system (OS) runtime threads, which can be controlled by an environment variable. Be default, the number of cores in the system may be used as the number of OS runtime threads. In step 410, the number of CUDA threads to be launched may be evaluated and statistically partitioned to the number of runtime threads. Each runtime thread executes a portion of the compiled code sequentially and waits on a barrier. When all runtime threads reach the barrier, the CTA has completed. In step 415 runtime environment 227 or device driver 203 launches the compiled code for execution by CPU 202.

Translator 220, compiler 225, and runtime environment 227 are used to convert CUDA application programs into code for execution by a generator purpose CPU. The CUDA programming model supports bulk synchronous task parallelism, where each task is composed of fine-grained SPMD threads. Use of the CUDA programming model has been limited to programmers willing to write specialized code for execution by GPUs. This specialized code may be converted for execution by a general purpose CPU without requiring the programmer to rewrite the CUDA application program. The three key abstractions supported by CUDA are SPMD thread blocks, barrier synchronization, and shared memory. Translator 220 serializes operations across the fine-grained threads of a CUDA thread block into a single CPU thread and performs optimizing transformations to convert a CUDA application program.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

The invention claimed is:

1. A computer-implemented method for configuring a general purpose processor to execute a translated application program, the method comprising:

receiving the translated application program that is converted from an application program written using a parallel programming model for execution on a multi-core graphics processing unit, wherein the translated application program includes at least one loop that iterates over at least one dimension of a cooperative thread array that is referenced by a divergent statement identified by classification information indicating convergent statements and divergent statements, and the at least one dimension corresponds to a number of threads that are concurrently executed by a parallel processor within the multi-core graphics processing unit, wherein divergent statements comprise statements that reference cooperative thread array dimensions and convergent statements comprise statements that do not reference a particular cooperative thread array dimension;

compiling the translated application program to produce compiled code for execution by the general purpose processor;

determining a number of execution cores in the general purpose processor that are available to execute the compiled code;

configuring the general purpose processor to enable the number of execution cores; and launching the compiled code for execution by the general purpose processor including the number of execution cores.

2. The method of claim 1, wherein the translated application program is produced by partitioning the application program into regions of synchronization independent instructions to produce a partitioned application program and inserting a loop around at least one region of the partitioned application program, wherein the loop iterates over the at least one dimension of the cooperative thread array.

3. The method of claim 2, wherein a first region of the partitioned application program includes instructions that are before a synchronization barrier instruction and a second region of the partitioned application program includes instruction that are after the synchronization barrier instruction.

4. The method of claim 3, wherein the translated application program includes a first loop nest around the first region of the partitioned application program to ensure that all threads in the cooperative thread array will complete execution of the first region of the partitioned application program before any one of the threads in the cooperative thread array begins execution of the second region of the translated application program.

5. The method of claim 1, wherein only a first dimension of the cooperative thread array is divergent and the translated application program includes a loop that iterates over the first dimension of the cooperative thread array.

6. The method of claim 1, further comprising the step of executing the compiled code using the general purpose processor.

7. The method of claim 1, wherein the step of compiling includes performing optimizations that are specific to the general purpose processor.

8. The computer-implemented method of claim 1, wherein the classification information further indicates that the divergent statement is divergent with respect to the at least one dimension.

9. The computer-implemented method of claim 8, further comprising reordering the divergent statement and a second divergent statement from being not adjacent to being adjacent based on the classification information, wherein the classification information indicates that the divergent statement and the second divergent statement are divergent in the at least one dimension.

10. A non-transitory computer-readable medium that includes instructions that, when executed by a general purpose processor, configure the general purpose processor to execute a translated application program, by performing the steps of:

receiving the translated application program that is converted from an application program written using a parallel programming model for execution on a multi-core graphics processing unit, wherein the translated application includes at least one loop that iterates over at least one dimension of a cooperative thread array that is referenced by a divergent statement identified by classification information indicating convergent statements and divergent statements, and the at least one dimension corresponds to a number of threads that are concurrently executed by a parallel processor within the multi-core graphics processing unit, wherein divergent statements comprise statements that reference cooperative thread array dimensions and convergent statements comprise statements that do not reference a particular cooperative thread array dimension;

compiling the translated application program to produce compiled code for execution by the general purpose processor;

determining a number of execution cores in the general purpose processor that are available to execute the translated application program;

configuring the general purpose processor to enable the number of execution cores; and launching the compiled code for execution by the general purpose processor including the number of execution cores.

11. The non-transitory computer-readable medium of claim 10, wherein the translated application program is produced by partitioning the application program into regions of synchronization independent instructions to produce a partitioned application program and inserting a loop around at least one region of the partitioned application program, wherein the loop iterates the at least one dimension of the cooperative thread array.

12. The non-transitory computer-readable medium of claim 11, wherein a first region of the partitioned application program includes instructions that are before a synchronization barrier instruction and a second region of the partitioned application program includes instruction that are after the synchronization barrier instruction.

13. The non-transitory computer-readable medium of claim 12, wherein the translated application program includes a first loop nest around the first region of the partitioned application program to ensure that all threads in the cooperative thread array will complete execution of the first region of the partitioned application program before any one of the threads in the cooperative thread array begins execution of the second region of the translated application program.

14. The non-transitory computer-readable medium of claim 10, only a first dimension of the cooperative thread array is divergent and the translated application program includes a loop that iterates over the first dimension of the cooperative thread array.

15. The non-transitory computer-readable medium of claim 10, further comprising the step of executing the translated application program using the general purpose processor.

16. The non-transitory computer-readable medium of claim 10, wherein the step of compiling includes performing optimizations that are specific to the general purpose processor.

17. A computing system configured to execute a translated application program, comprising:
   a general purpose processor configured to execute a compiler;
   a system memory coupled to the processor and configured to store the translated application program and compiled code; and
   the compiler that is configured to:
      receive the translated application program that is converted from an application program written using a parallel programming model for execution on a multi-core graphics processing unit, wherein the translated application program includes at least one loop that iterates over at least one dimension of a cooperative thread array that is referenced by a divergent statement identified by classification information indicating convergent statements and divergent statements, and the at least one dimension corresponds to a number of threads that are concurrently executed by a parallel processor within the multi-core graphics processing unit, wherein divergent statements comprise statements that reference cooperative thread array dimensions and convergent statements comprise statements that do not reference a particular cooperative thread array dimension; and
      compile the translated application program to produce compiled code for execution by the general purpose processor;
   a device driver that is configured to:
      determine a number of execution cores in the general purpose processor that are available to execute the translated application program; and
      configure the general purpose processor to enable the number of execution cores; and
   a runtime environment that is configured to launch the compiled code for execution by the general purpose processor including the number of execution cores.

18. The computing system of claim 17, wherein the translated application program is produced by partitioning the application program into regions of synchronization independent instructions to produce a partitioned application program and inserting a loop around at least one region of the partitioned application program, wherein the loop iterates over the at least one dimension of the cooperative thread array.

19. The computing system of claim 18, wherein a first region of the partitioned application program includes instructions that are before a synchronization barrier instruction and a second region of the partitioned application program includes instruction that are after the synchronization barrier instruction.

20. The computing system of claim 19, wherein the translated application program includes a first loop nest around the first region of the partitioned application program to ensure that all threads in the cooperative thread array will complete execution of the first region of the partitioned application program before any one of the threads in the cooperative thread array begins execution of the second region of the translated application program.

21. The computer system of claim 17, only a first dimension of the cooperative thread array is divergent and the translated application program includes a loop that iterates over the first dimension of the cooperative thread array.

22. The computer system of claim 17, wherein the general purpose processor is further configured to execute the compiled code.

* * * * *